Patented July 30, 1935

2,009,633

UNITED STATES PATENT OFFICE 2,009,633

POLISHING COMPOSITION AND METHOD OF MAKING THE SAME

Louis Friedrich Wilhelm Pape, Dusseldorf-Benrath, Germany, assignor, by mesne assignments, to "Unichem" Chemikalien Handels A.-G., Zurich, Switzerland, a corporation of Switzerland No Drawing. Application September 20, 1932, Serial No. 634,080. In Germany October 6, 1931

4 Claims. (Cl. 134—24)

Polishing waxes and shoe polishes containing more or less water possess in comparison with pure oil products several advantages in that they, for instance, always will dry faster than the latter and will never attack lacquers or pigments. Materials of this kind are produced by means of emulsifiers such as saponified fats and the like. In this way emulsions are obtained which in part are stable. On account of the alkali content, however, floors, leather and other materials treated with such emulsions are damaged. Moreover, wax emulsions produced by means of sulphonated oils and similar agents are not sufficiently stable and after some time the substances in emulsion will frequently separate.

It has now been found that polishing waxes, shoe polishes and similar substances of unlimited durability may be produced from wax-water-oil-emulsions by using as emulsifiers sulphonic acid esters of alcohols or salts of the sulphuric acid ester of alcohols which contain at least 8 C-atoms in the molecule.

When producing the new polishing masses and the like the said emulsifiers may, for instance, be added to the water with which the wax melt, i. e. melts of wax mixtures of the character commonly used for the production of polishing masses, is mixed. In comparison with hitherto known products of this character the novel products possess many advantages. They are, for instance, extremely stable and durable and are liquid or of paste-like consistency at much higher concentrations than the polishing masses hitherto known.

Example 1

14 kg. of paraffin, 3 kg. of ozokerite and 3 kg. of carnauba wax are melted together and 38 kg. of turpentine oil are added to the melt under stirring. The solution is thereupon at 80-90° C. mixed with 38 liters of water (of 90° C.) to which 1 kg. of the sodium salt of the sulphonation product of glykol-mono-oleic-acid-ester has been added. After cooling a product of paste-like nature is obtained, which is extremely well suited for use as polishing material.

Example 2

11 kg. of paraffin, 2 kg. of bees wax, 3 kg. of ozokerite, 3 kg. of candelilla wax and 1 kg. of stearin are melted and stirred together with 40 kg. of lacquer test benzine at about 80° C. To this melt a solution of 1 kg. of the sodium salt of the sulphuric acid ester of the alcohol mixture obtained by reduction of cocoa oil in 39 liters of water of 90° C. is added under vehement stirring. After cooling a stable, liquid wax emulsion is obtained, which is extremely well suited for polishing, burnishing and similar purposes.

The production of sulphuric acid esters of higher fatty alcohols is known per se and it is further known that compounds of this kind are valuable expedients in the textile, leather, pharmaceutical and other branches of trade, on account of their wetting, emulsifying, purifying and softening properties.

It has, however, hitherto not been known that it is possible by means of such sulphuric acid esters or salts of such esters to produce polishing masses, shoe polishes and similar materials of particularly advantageous properties.

I claim:—

1. A process of producing a stable wax-water-oil-emulsion adapted for use as a polishing mass, shoe polish and the like, comprising the steps of dissolving a wax melt in an oily solvent of same and admixing an aqueous solution of a salt of the sulphuric acid ester of an alcohol which contains at least 8 C-atoms in the molecule.

2. A process of producing a stable wax-water-oil-emulsion adapted for use as a polishing mass, shoe polish and the like, comprising the steps of dissolving a wax melt in an oily solvent of same and admixing with such solution an aqueous solution of a salt of the sulphuric acid ester of an alcohol which contains at least 8 C-atoms in the molecule at a temperature about 50° C.

3. A wax-water-oil-emulsion adapted for use as a polishing material comprising, wax, an oil solvent therefor, water and a salt of sulphuric acid ester of an alcohol having 8 or more carbon atoms in the molecule.

4. A wax-water-oil-emulsion adapted for use as a polishing material comprising wax, an oil solvent therefor, water and salts of sulphuric acid esters of a mixture of the fatty alcohols the alkyl radicals of which correspond in the number of carbon atoms to the alkyl radicals of the acid components of the glycerides of cocoa oil.

LOUIS FRIEDRICH WILHELM PAPE.